United States Patent
Steinberg et al.

(10) Patent No.: US 9,524,476 B2
(45) Date of Patent: Dec. 20, 2016

(54) METHODS AND SYSTEMS FOR AUTOMATIC SELECTION OF PREFERRED SIZE CLASSIFICATION AND REGRESSION TREES

(71) Applicant: HEALTH CARE PRODUCTIVITY, INC., San Diego, CA (US)

(72) Inventors: Dan Steinberg, San Diego, CA (US); Nicholas Scott Cardell, Pullman, WA (US)

(73) Assignee: HEALTH CARE PRODUCTIVITY, INC., San Diego, CA (US)

( * ) Notice: Subject to any disclaimer, the term of this patent is extended or adjusted under 35 U.S.C. 154(b) by 0 days.

(21) Appl. No.: 15/081,790

(22) Filed: Mar. 25, 2016

(65) Prior Publication Data
US 2016/0210561 A1 Jul. 21, 2016

Related U.S. Application Data

(63) Continuation of application No. 11/649,399, filed on Jan. 4, 2007, now Pat. No. 9,330,127.

(51) Int. Cl.
*G06F 17/30* (2006.01)
*G06N 99/00* (2010.01)
(Continued)

(52) U.S. Cl.
CPC ......... *G06N 99/005* (2013.01); *G06F 17/3053* (2013.01); *G06F 17/30327* (2013.01);
(Continued)

(58) Field of Classification Search
CPC ............... G06F 17/30625; G06F 17/30327; G06F 17/30961; G06F 17/30339; G06F 17/30371; G06F 17/3053; G06N 99/005
(Continued)

(56) References Cited

U.S. PATENT DOCUMENTS 5,799,311 A * 8/1998 Agrawal ........... G06F 17/30625
707/E17.087
5,870,735 A * 2/1999 Agrawal ........... G06F 17/30625
707/E17.087
(Continued)

FOREIGN PATENT DOCUMENTS

WO 2006102381 A2 9/2006

OTHER PUBLICATIONS

International Search Report of the International Searching Authority in PCT/US08/50153, mailed May 22, 2008.
(Continued)

*Primary Examiner* — Phong Nguyen
(74) *Attorney, Agent, or Firm* — Innatricity, LLC; Herbert L. Lacey, III

(57) ABSTRACT

Methods and systems for automatically identifying and selecting preferred size classification and regression trees are disclosed. The invention is used to identify a specific decision tree or group of preferred size trees that are consistent across train and test samples in node-specific details that are often important to decision makers. Specifically, for a tree to be identified as preferred by this system, the train and test samples must both agree on key measures for every terminal node of the tree. In addition to this node-by-node criterion, an additional tree selection method may be imposed. Accordingly, the train and test samples rank order the nodes on a relevant measure in the same way. Both consistency criteria may be applied in a fuzzy manner in which agreement must be close but need not be exact.

20 Claims, 14 Drawing Sheets

(51) Int. Cl.
G06K 9/62 (2006.01)
G06Q 30/02 (2012.01)
G06Q 40/08 (2012.01)
(52) U.S. Cl.
CPC .. *G06F 17/30339* (2013.01); *G06F 17/30371* (2013.01); *G06F 17/30625* (2013.01); *G06F 17/30961* (2013.01); *G06K 9/6282* (2013.01); *G06Q 30/0254* (2013.01); *G06Q 40/08* (2013.01)
(58) Field of Classification Search
USPC .......................................... 707/797, E17.087
See application file for complete search history.

(56) References Cited

U.S. PATENT DOCUMENTS

| | | | | |
|---|---|---|---|---|
| 6,138,115 | A * | 10/2000 | Agrawal | G06F 17/30625 382/226 |
| 6,182,058 | B1 | 1/2001 | Kohavi | |
| 6,247,016 | B1 * | 6/2001 | Rastogi | G06F 17/30598 707/E17.012 |
| 6,351,561 | B1 * | 2/2002 | Iyengar | G06K 9/6282 382/226 |
| 6,442,561 | B1 * | 8/2002 | Gehrke | G06F 17/30705 707/776 |
| 6,865,573 | B1 * | 3/2005 | Hornick | G06F 17/3056 707/748 |
| 7,328,218 | B2 * | 2/2008 | Steinberg | G06F 17/30598 707/999.101 |
| 8,108,765 | B2 * | 1/2012 | Lim | G06F 17/30923 715/209 |
| 2002/0193950 | A1 * | 12/2002 | Gavin | H01J 49/0036 702/28 |
| 2003/0088565 | A1 * | 5/2003 | Walter | G06K 9/6219 707/999.006 |
| 2003/0219797 | A1 * | 11/2003 | Zhao | G06F 19/20 435/6.16 |
| 2008/0092034 | A1 * | 4/2008 | Lim | G06F 17/30923 715/234 |

OTHER PUBLICATIONS

Written Opinion of the International Searching Authority in PCT/US08/50153, mailed May 22, 2008.
International Preliminary Report on Patentability of the International Bureau in PCT/US08/50153, Jul. 7, 2009.
Quinlan, J.R., "Inferring Decision Trees Using the Minimum Description Length Principle," Information and Computation 80, 227-248 (1989).
Quinlan, J.R., "Simplifying decision trees," Massachusetts Institute of Technology Artificial Intelligence Laboratory, AI Memo No. 930, Dec. 1986.
Buntine, W., "Learning classification trees," Statistics and Computing (1992) 2, 63-73.
Esposito, F., Malerba, D. and Semeraro, G., "Simplifying Decision Trees by Pruning and Grafting: New Results," in N. Lavrac & S. Wrobel, eds. 'Machine Learning: ECML-95(Proc. European Conf. on Machine Learning, 1995)'.
Kohavi, R., "A Study of Cross-Validation and Bootstrap for Accuracy Estimation and Model Selection," Proceedings of the 14.sup.th International Joint Conference on Artificial Intelligence, Stanford University, 1995.
Bradford, J.P., Kunz, C., Kohavi, R., Brunk, C., and Brodley, C.E., "Pruning Decision Trees with Misclassification Costs," Electrical and Computer Engineering, ECE Technical Reports, Mar. 1998.
Quinlan, J.R., Induction of Decision Trees, Machine Learning, vol. 1, No. 1, pp. 81-106 (1986).
Chou, P., Lookabaugh, T. and Gray, R.M., "Optimal Pruning with Applications to Tree-Structured Source Coding and Modeling," IEEE Trans. Inform. Theory, vol. 35, No. 2, Mar. 1989, pp. 299-315.
Nobel, Andrew B., "Analysis of a complexity based pruning scheme for classification trees," Sep. 16, 2000, IEEE Transactions on Information Theory, vol. 48 pp. 2362-2368.
Quinlan, J.R., "Constructing Decision Trees," C4.5: Programs for Machine Learning, Morgan Kaufmann Publishers, Inc., pp. 17-26 (1993). Submitted in U.S. Appl. No. 11/649,399.
Hastie, T., Tibshirani, R. and Friedman, J., "The Elements of Statistical Learning: Data Mining, Inference, and Prediction," Springer, New York, 2001. Submitted in U.S. Appl. No. 11/649,399.
Berry, M.J.A. and Linoff, G.S., "Mastering Data Mining: The Art and Science of Customer Relationship Management," John Wiley & Sons, Inc. 2000. Submitted in U.S. Appl. No. 11/649,399.
Brieman, L., Friedman, J.H., Olshen, R.A. and Stone, C.J., "Classification and Regression Trees," Wadsworth, Belmont, 1984. Submitted in U.S. Appl. No. 11/649,399.
"Companies: Products for Data Mining and Knowledge Discovery," http://www.kdnuggets.com/companies/products.html, last updated Feb. 13, 2006.
"Software for Data Mining and Knowledge Discovery," http://www.kdnuggets.com/software/index.html, Date: Aug. 9, 2007.
"Publications and References on Data Mining and Knowledge Discovery," http://www.kdnuggets.com/publications/index.html, last updated Feb. 13, 2006.
"Angoss Provides Predictive Analytics and Data Mining Insight", Jun. 16, 2005, http://www.prweb.com/releases/2005/06/prweb251899.htm.
"SAS Discusses Business Analytics Role in Extending Business Intelligence," Jun. 21, 2005, http://www.prweb.com/releases/2005/06/prweb253785.htm.
"SAS Leads Data Mining and Data Warhousing Access Tools Markets," Aug. 9, 2004, Carolina Newswire.
"Gartner Crowns SAS and SPSS Data Mining Kings," Jan. 26, 2006, http://www.destinationCRM.com/articles/default.asp?ArticleID=5794.
Quinlan, J.R., "Constructing Decision Trees," C4.5: Programs for Machine Learning, Morgan Kaufmann Publishers, Inc., pp. 17-26 (1993).
Hastie, T., Tibshirani, R. and Friedman, J., "The Elements of Statistical Learning: Data Mining, Inference, and Prediction," Springer, New York, 2001.
Berry, M.J.A. and Linoff, G.S., "Mastering Data Mining: The Art and Science of Customer Relationship Management," John Wiley & Sons, Inc. 2000.
Brieman, L., Friedman, J.H., Olshen, R.A. and Stone, C.J., "Classification and Regression Trees," Wadsworth, Belmont, 1984.

* cited by examiner

| Record | Target | Handpc | Userprice | Age | Educatn | City | Telephn |
|---|---|---|---|---|---|---|---|
| 1 | Yes | 150 | 0.10 | 25 | 11 | AA | 55 |
| 2 | No | 50 | 0.80 | 45 | 16 | BB | 17 |
| 3 | Yes | 75 | 0.30 | 42 | 13 | AA | 22 |
| ⋮ | No | 125 | 1.00 | 27 | 12 | AA | 15 |
| ⋮ | No | 200 | 0.20 | 33 | 17 | BB | 27 |
| ⋮ | No | 150 | 0.60 | 29 | 10 | CC | 110 |

Figure 2
(Prior art)

| Node | Direction Agreement | Dir Z | Rank Z | Lift Learn | Lift Test |
|---|---|---|---|---|---|
| Tree_1 | | | 1.926 | | 1.926 |
| 1 | Disagree | 2.746 | 1.926 | 0.39 | 0.45 |
| 2 | Agree | 1.029 | 0.000 | 0.83 | 0.65 |
| 3 | Agree | 0.102 | 1.926 | 1.49 | 1.28 |
| 4 | Agree | 1.516 | 0.000 | 0.52 | 1.03 |
| 5 | Disagree | 2.746 | 1.926 | 1.24 | 1.14 |
| 6 | Agree | 0.880 | 0.000 | 1.76 | 1.68 |
|   | Agree | 1.239 | 0.000 |   |   |

| Node | Rank Match | Rank Learn | Rank Test | Lift Learn | Lift Test |
|---|---|---|---|---|---|
| Tree_1 | | | | 1.926 | |
| 6 | Match | 1 | 1 | 1.76 | 1.68 |
| 3 | Match | 2 | 2 | 1.49 | 1.28 |
| 5 | Match | 3 | 3 | 1.24 | 1.14 |
| 2 | Mismatch | 4 | 5 | 0.63 | 0.65 |
| 4 | Mismatch | 5 | 4 | 0.52 | 1.03 |
| 1 | Match | 6 | 6 | 0.39 | 0.45 |

| Node | Rank Match | Rank Learn | Rank Test | Rank Z | Lift Learn | Lift Test | Fuzzy Cutoff |
|---|---|---|---|---|---|---|---|
| Tree_1 | | | | 1.926 | | 1.926 | 2.00 |
| 0 | Match | 1 | 1 | 0.000 | 1.76 | 1.68 | |
| 3 | Match | 2 | 2 | 0.000 | 1.49 | 1.28 | |
| 5 | Match | 3 | 3 | 0.000 | 1.24 | 1.14 | |
| 2 | Match | 4 | 4 | 1.926 | 0.63 | 0.65 | |
| 4 | Match | 5 | 5 | 1.926 | 0.52 | 1.03 | |
| 1 | Match | 6 | 6 | 0.000 | 0.39 | 0.45 | |

| Node | Direction Agreement | Rank Agreement | Chi Z | P-Val Z | UM Learn | UM Test | N Node Learn | N Node Test | Fuzzy | Agree | Match |
|---|---|---|---|---|---|---|---|---|---|---|---|
| | | | | | | | | | | 1.00 | 2.00 |
| Tree_1 | Agree | Match | 2.746 | 1.996 | 1.925 | 1.96 | 391 | 397 | | | |
| 1 | Agree | Match | 1.000 | 0.000 | 1.02 | 0.87 | 61 | 49 | | | |
| 2 | Agree | Match | 2.746 | 1.996 | 1.40 | 1.38 | 63 | 49 | | | |
| 3 | Agree | Match | 0.102 | 1.926 | 1.38 | 0.88 | 132 | 132 | | | |
| 4 | Agree | Match | 0.880 | 0.000 | 0.75 | 0.71 | 85 | 97 | | | |
| 5 | Agree | Match | 1.510 | 0.000 | 0.50 | 0.30 | 278 | 288 | | | |
| 6 | Agree | Match | 1.239 | 0.000 | 0.23 | | | | | | |

1210

| Terminal Nodes | Direction Agreement | Rank Agreement | Direction Max-Z | Rank Max-Z | Dir. Fail Count | Rank Fail Count |
|---|---|---|---|---|---|---|
| 17 | Agree | Match | 2.693 | 1.607 | 0 | 0 |
| 16 | Disagree | Match | 2.746 | 1.754 | 1 | 0 |
| 14 | Disagree | Match | 2.746 | 1.464 | 1 | 0 |
| 12 | Disagree | Mismatch | 2.746 | 2.360 | 1 | 1 |
| 10 | Disagree | Match | 2.746 | 1.473 | 1 | 0 |
| 8 | Disagree | Match | 2.746 | 1.926 | 1 | 0 |
| 6 | Disagree | Match | 1.516 | 1.926 | 1 | 0 |
| 4 | Agree | Match | 0.449 | 1.717 | 0 | 0 |
| 2 | Agree | Match | 2.000 | 0.000 | 0 | 0 |
| Fuzzy Cutoff | | | 2.000 | 2.000 | | |

METHODS AND SYSTEMS FOR AUTOMATIC SELECTION OF PREFERRED SIZE CLASSIFICATION AND REGRESSION TREES

CROSS REFERENCE TO RELATED APPLICATIONS

This application is a continuation of, and claims the priority benefit of, U.S. patent application Ser. No. 11/649,399, filed Jan. 4, 2007, and titled, "Methods and systems for automatic selection of classification and regression trees." The above-referenced application is hereby incorporated by reference in its entirety for all purposes.

FIELD OF THE INVENTION

The present invention relates to computer-implemented data analysis. The present invention more specifically relates to selecting preferential-sized trees in classification and regression trees.

BACKGROUND OF THE INVENTION

Data mining encompasses a broad collection of computer intensive methods for discovering patterns in data for a variety of purposes, including classification, accurate prediction and gaining insight into a causal process. Typically, data mining requires historical data in the form of a table consisting of rows, also known as instances, records, cases, or observations, and columns, also known as attributes, variables or predictors. One of the attributes in the historical data is nominated as a "target" and the process of data mining allows the target to be predicted. A predictive model is created using data, often called the "training" or "learning" data.

From data mining, models are created that can be used to predict the target for new, unseen, or future data, namely data other than the training or learning data, with satisfactory accuracy. Such models can assist decision makers and researchers to understand the causal processes generating the target. When a database attribute records membership in a class, such as "good vs. bad" or "A vs. B vs. C," it is known as a nominal attribute, and when the objective of the data mining is to be able to predict this class membership (the "class label"), the activity is known as classification. When the target attribute of the data mining process records a quantity such as the monetary value of a default, or the amount charged to a credit card in a month, the modeling activity is called regression.

Banking is an example of an application of data mining and regression trees. In banking, data mining classification models may be used to learn the patterns that can help predict, for example, whether an applicant for a loan is likely to default, make late payments, or repay the loan in full in a timely manner (default vs. slow pay vs. current). Regression trees may be used to predict quantities such as the balances a credit card holder accumulates in a specified period of time.

In marketing, another example application of data mining and regression trees, classification models may be used to predict whether a household is likely to respond to an offer of a new product or service (responder vs. non-responder). Regression models may be used to predict how much a person will spend in a specific product category. Models are learned from historical data, such as prior bank records where the target attribute has already been observed, and the model may be used to make predictions for new instances for which the value of the target has not yet been observed. To support predictions based on the model, the new data contain at least some of the same predictive attributes found in the historical training data. Data mining can be applied to virtually any type of data that has been appropriately organized. Examples of areas in which data mining has been used include credit risk analysis, database marketing, fraud detection in credit card transactions, insurance claims and loan applications, pharmaceutical drug discovery, computer network intrusion detection, and fault analysis in manufacturing.

The performance of a data mining or predictive model can be measured in a variety of ways. Several standard criteria have become established in the literature. For classification models these criteria include: Cross-Entropy or Log-Likelihood, Area Under the Receiver Operating Characteristic Curve ("ROC"), Classification Accuracy, Lift in a specified percentile of a dataset, such as the top decile, and weighted measures of the costs of misclassification, where different classification mistakes have different consequences such as when rejecting a reliable borrower is not as serious a mistake as accepting an unreliable borrower. For example, Classification Error has been the criterion most commonly used in prior art. Most discussions of optimal tree selection have referenced this criterion because of its simplicity. For regression, the measures include Sum of Squared Errors, including R-squared and Mean squared Error, Sum of Absolute Deviations, including Mean and/or Median Absolute Deviation, and the Huber-M class of measures, which are a hybrid of both squared and absolute deviations. For the purposes of this disclosure, the method selected for measuring model performance does not matter. The described methods and systems are applicable using any of these common methods. In general, for decision making purposes, it is the performance of the model on test data or on previously unseen data that is considered definitive.

Models that perform substantially better on the training data than on appropriate unseen data are said to be overfit, and a key to building reliable data mining models is finding models that are not overfit. The data mining literature, as well as the statistical literature that preceded it, contains a number of scientific studies addressing the issue of the avoidance of overfitting. The field of decision trees contains certain techniques intended to avoid overfitting.

One older prior art method still in use for decision trees is the stopping rule. Stopping rules are applied during the tree-growing process and are used to decide whether a branch of the tree should be allowed to grow further or whether it should be forced to terminate. When all branches have been forced to terminate, the tree and the model are considered complete. The stopping rule is intended to detect when the evidence in the training data for further elaboration of the tree is so weak that stopping is preferable to further growing of the tree. Weakness may be measured by a statistical criterion, such as a chi-square test. The expectation is that the stopping rule will yield trees that are not overfit.

Another class of prior art methods to avoid overfitting relies on pruning. Trees are first grown without a stopping rule and thus grown intentionally large and almost certainly overfit. The pruning process is applied after the growing is complete and is intended to prune away the overfit parts of the tree. When optimal trees are selected via training sample pruning, each branch of the tree is pruned to a length that has been determined to be best based on an evaluation criterion calculated using the training data only.

A number of variations on this theme have been proposed in the literature. One example, the popular C4.5 decision tree uses the upper bound of the confidence interval based on the binomial distribution to derive a pessimistic estimate of the unseen data error rate in each node.

This prior art pruning approach to optimal tree selection proceeds as follows. First, a large, probably overfit decision tree is grown. The pruning process then works backwards from the bottom of the tree. For each parent of a terminal node or nodes, a comparison is made between the pessimistic estimate of the error rate when the parent is allowed to be split and the estimate when the parent node is not split and instead made terminal. A split is retained if it results in a smaller estimated pessimistic error rate than would be obtained if the split were removed. As splits are pruned away, the tree becomes progressively smaller. This process of testing a node to see if it should be allowed to be split is repeated moving upwards through the tree.

This method does not make use of test data or cross validation, relying instead on internal calculations based on training data. Although the method resembles a node-by-node comparison method, the pruning procedure is intended to yield a tree with the best estimated pessimistic error rate overall. Thus, the method is focused on the reduction of classification error and not on a notion of agreement of specific predictions made within a decision tree node. The same prior art method can be adapted to the case where plentiful test data are available so that reliable estimates of the error in any portion of the tree can be based on test data.

In a 1987 article entitled "Simplifying Decision Trees," Quinlan briefly described such a method without elaboration, observing simply that test data could be used for node classification accuracy measurement and therefore tree selection. He advised against this approach for two reasons. First, a test data-based tree selection procedure requires more data, which may be a burden. Second, pruning on the basis of test data performance may prune away valuable parts of the tree that happen to receive little test data in a specific test sample. Instead, the method described by Quinlan focused on reducing classification error and not on achieving a match or agreement between train and test data.

In the classical prior art decision tree algorithm of Breiman, Friedman, Olshen, and Stone, the pruning process is used not to identify an optimal tree but to identify a set of candidate trees of different sizes. As in other pruning procedures, smaller trees are obtained from larger trees by removing selected nodes. For a tree of a given size, the CART cost-complexity pruning process identifies which node or nodes are to be pruned to arrive at a smaller tree.

In many cases a pruning step removes just one split from the bottom of the tree but in some circumstances more than one split may be removed by the specific cost-complexity pruning formula. The process of cost-complexity pruning is intended to effect the smallest useful reduction in tree size in any one pruning step, and the process is repeated until all splits have been pruned away. The cost-complexity pruning process thus defines a collection or sequence of nested trees, each obtained from its predecessor by pruning away some nodes. The optimal tree is then identified as the one tree in this sequence with the best performance on either explicit test data or testing via cross validation.

Consequently, in the CART decision tree, a test sample or testing via cross validation is required to complete the tree selection process once the pruning has been accomplished. This is in contrast to the C4.5 methodology that uses a pruning criterion that does not refer to test data. The details of the pruning process are not relevant because the methodology described herein is applicable no matter how the tree is pruned or indeed whether the tree is or is not pruned. Other pruning methods based on a measure of model complexity have also been proposed.

Several prior art methods, including the previously described methods, produce decision trees that often perform roughly as expected on unseen data. For example, a tree expected to have a classification accuracy of 75% based on training data might exhibit a roughly similar accuracy of say 72% on unseen data. However, decision makers may consider the performance of such apparently successful prior art optimal models unsatisfactory when the individual terminal nodes of the tree are examined.

That is, while the tree as a whole may yield the expected number of correctly classified cases, the number of correctly classified cases in a specific node or nodes of interest may be far from the number expected. Because the model as a whole has a performance that is a weighted average of the performances within the terminal nodes, underperformance in some nodes may be compensated for by overperformance in other nodes of the tree, yielding a performance that is considered satisfactory overall.

Decision makers, however, may insist that every node in the tree achieve certain minimum performance standards and that deficiencies in one node may not be compensated for by excellent performance in other nodes. Alternatively, decision makers often deploy only selected portions of a decision tree. Thus, for practical purposes the performance of selected portions of the tree may be what is relevant rather than the performance of the tree overall. The methods and systems described herein make use of detailed examination of performance in specific nodes of a decision tree. Thus, a tree that is deemed optimal under prior art methods may be deemed far from optimal under the methods and systems described herein.

A specific example can be taken from the field of marketing. Marketing decision makers often search for customer segments that are above average in their propensity to respond to certain product and price offers, commonly known as responder segments. The terminal nodes of a decision tree will yield two vital pieces of information to the decision maker: whether the segment in question is above average, in other words whether the lift in the segment exceeds 1.0, and the expected response rate. A segment that appears to be a responder segment on the training data, having a lift greater than 1.0, but which is shown to be a non-responder segment on test data, having a lift less than 1.0, would be rejected by a decision maker as suspect. A disagreement between the train and test results regarding where a node sits relative to this threshold is core to certain decision makers.

Decision makers may well demand that an acceptable tree cannot exhibit a train/test disagreement regarding the responder or no-responder status of any node. Further, when looking at a market segment defined by a decision tree, marketers would not regard a segment as satisfactory if the discrepancy between the train and test responsiveness in that node is substantial, or if the rank order of that segment differed substantially between train and test data. Prior art methods of optimal tree selection cannot guarantee trees that will meet these train/test consistency requirements.

Consequently, there is a need for methods and systems that address the aforementioned shortcomings of prior art automatic tree selection methods.

SUMMARY OF THE INVENTION

The following presents a simplified summary of methods, apparatus and systems associated with automatic selection of preferential-sized trees in accordance with the present application. This summary is not an extensive overview and is not intended to identify key or critical elements of the methods, apparatus and/or systems or to delineate the scope of the methods, apparatus and systems. It conceptually identifies the methods, apparatus and systems in a simplified form as a prelude to the more detailed description that is presented later.

According to one aspect of the present application, a computer-implemented method is disclosed for automatically selecting a preferred tree among a plurality of trees. The method includes the steps of accessing a stored data table comprising a plurality of records and a plurality of columns and then identifying a training set of records and a test set of records within the data table records. The method also includes the step of analyzing the training set to obtain a collection of at least one fitted tree. Each tree is made up of at least one node, and at least one node of each tree is a terminal node.

The method further includes the steps of determining the training set records associated with each node of each tree; determining the test set records associated with each node of each tree; and determining an agreement statistic and a rank match statistic associated with each node of each tree. In addition, the method includes the steps of analyzing the agreement statistic and the rank match statistic for each node of each tree and identifying at least one preferred tree based on the step of analyzing.

According to a second aspect of the present application, a system is disclosed for implementing the aforementioned method steps.

For optimal tree selection, prior art methods either focus on overall tree performance, whether measured by internal or test-based methods, or on node classification accuracy. In contrast, the present application accomplishes optimal tree selection by focusing explicitly on the train and test results in terminal nodes, thus requiring the presence of both train and test data. The present application makes use of two comparisons, which together are referred to as the TRAIN/TEST CONSISTENCY CHECKS. First, it compares train and test results in every terminal node of a candidate tree. If the results are not sufficiently similar the tree may be rejected as overfit, regardless of how well the tree performs on independent test data on the classification accuracy criterion. The train/test similarity may be calculated either on the basis of a performance score or on the basis of a decision threshold. This first consistency test is referred to herein as the AGREEMENT test. Second, using an appropriate performance measure, the present invention compares the ranking of the terminal nodes as ranked separately by the train and test data measurements. This second consistency test is referred to herein as the RANK MATCH test. If the rankings are not sufficiently similar the tree may be regarded as overfit. The basic TRAIN/TEST CONSISTENCY CHECK determines that an acceptable tree pass both the agreement and rank match tests; the optimal or preferred tree is the largest tree to pass both tests. A decision maker may vary this check by requiring that only one of the tests be passed or by allowing tests to be passed using approximate or fuzzy criteria.

Certain illustrative aspects of the methods and systems are described herein in connection with the following description and the annexed drawings. These aspects are indicative, however, of but a few of the various ways in which the principles of the methods, apparatus and systems may be employed and thus the examples are intended to include such aspects and equivalents. Other advantages and novel features may become apparent from the following detailed description when considered in conjunction with the drawings. In fact, after reading the following description, it will become apparent to a person skilled in the relevant art how to implement the invention in alternative environments.

For the purpose of this application, the term 'Bonferroni adjustment', refers to a technique used in statistical analysis to mitigate the well-known effects of multiple comparisons. Throughout this application reference to 'Bonferroni adjustment', 'Bonferroni correction', 'conventional Bonferroni adjustment', and the like, should be understood to refer to the technique developed by Carlo Emilio Bonferroni and known to those skilled in the art of statistics. A 'Bonferroni adjustment' is but one of several techniques that can be used to correct for errors which can arise when multiple pair-wise comparisons, or statistical tests, are performed at once in a data set; in such tests, the probability of a false positive increases with the number of hypotheses being tested. Other similar techniques include the Holm-Bonferroni method, and the Sidak correction. Performing at the same time multiple statistical tests or comparisons in the same data set can artificially raise the probability of encountering an outcome due to chance. A 'Bonferroni adjustment' attempts to control the probability of a false positive result by adjusting, or normalizing, the probability of an individual result to the number of hypotheses tested. For example, if a single outcome has a probability P and twenty hypotheses are being tested, a 'Bonferroni adjustment' would divide the significance level for all the tests combined by the number of hypotheses tested, testing each individual hypothesis at a statistical significance level of P/20. Thus, in practice a 'Bonferroni adjustment' divides the probability of each outcome by the number of comparisons.

BRIEF DESCRIPTION OF THE DRAWINGS

The present invention will be better understood from the following description of an exemplary embodiment of the invention, taken in conjunction with the accompanying drawings in which like reference numerals refer to like parts and in which:

FIG. 2 is a chart illustrating an example prior art organization of data to be used in the construction of a data mining model;

FIGS. 11A, 11B together comprise a chart illustrating the rank match test of the present application;

FIG. 13 is a chart illustrating an example of a table summarizing the tests of the present application. The table is designed to assist an analyst in selecting a preferred tree.

DETAILED DESCRIPTION OF THE PREFERRED EMBODIMENTS

Figure 1:
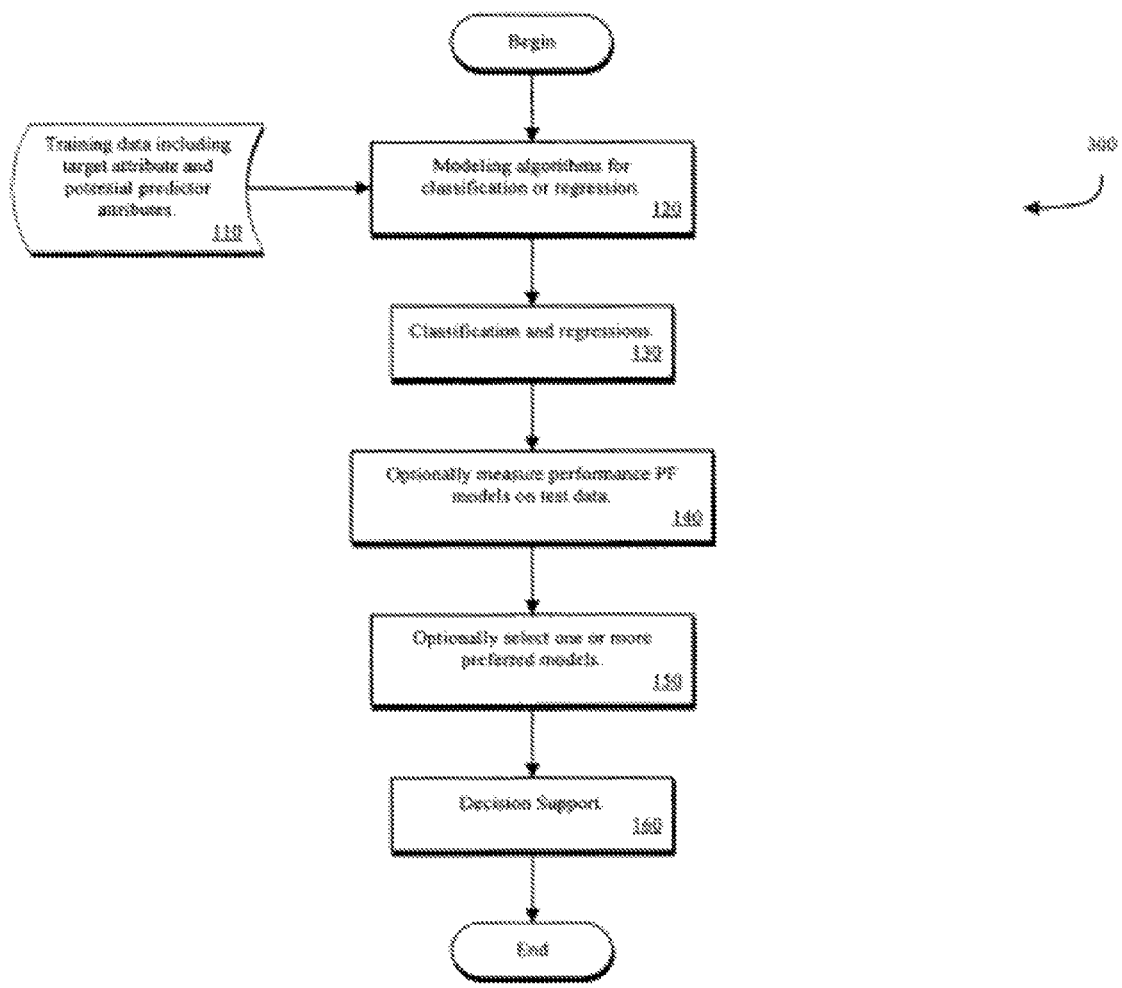
FIG. 1 is a flowchart illustrating a prior art process for the learning of a data mining model.

Example methods and systems are now described with reference to the drawings, where like reference numerals are used to refer to like elements throughout. In the following description, for purposes of explanation numerous specific details are set forth so as to facilitate thorough understanding of the methods and systems. It may be evident, however, that the methods and systems can be practiced without these specific details. In other instances, well-known structures and devices are shown in block diagram form in order to simplify the description.

FIG. 1 depicts an overview of an example prior art process for the training of a data mining model. At block 110, historical data are organized. The historical data include a target attribute and potential predictor attributes. Once organized, the data are provided to modeling algorithms for classification or regression at block 120. From the data, the modeling algorithms produce one or more classifiers or predictive regression models at block 130. Optionally, the models may be tested for predictive accuracy on data not used in the training process, block 140, and on the basis of these tests one or more models may be selected at block 150. As shown at block 160, after the best models have been selected they may be embedded in decision support or scoring systems that are used to classify, predict, and help guide decisions.

FIG. 2 is a chart that illustrates an example prior art organization of data to be used in the construction of a data mining model. The data table must include a target attribute and potential predictors. The example displays several records from a real world table.

Figure 3:
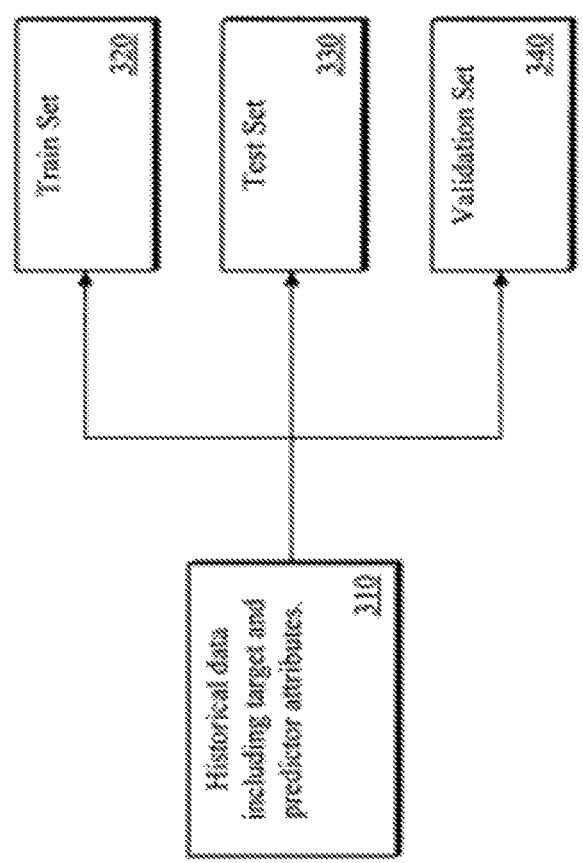
FIG. 3 is a block diagram illustrating a partitioning of historical records into a train set, a test set, and an optional validation set.

FIG. 3 is a block diagram illustrating the partitioning of the historical records 310 into a train set 320, a test set 330, and an optional validation set 340. As shown at block 310, data, including the target attribute and potential predictor attributes, are organized as required for data mining. The data are divided into train 320 and test portions 330. Many data mining practitioners also create an optional third "validation" portion 340. Prior art data mining models are typically constructed using only the training set data 320. The test set 330 and validation sets 340, if there are any, are normally used only for model selection and evaluation.

Figure 4:
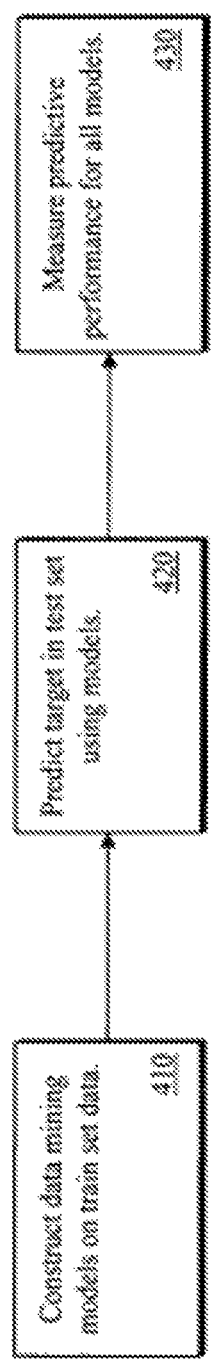
FIG. 4 is a block diagram illustrating how the data partitions may be used to evaluate data mining models.

FIG. 4 is a block diagram illustrating how the data partitions are used to evaluate data mining models. From the training data, the modeling algorithms produce a set of one or more candidate classifiers or predictive regression models 410. The models are used to make predictions on the unseen test, and, optionally, on the validation set 420. Performance of the model or models is then measured on the test data 430. Performance may optionally be measured on the validation set as well.

Figure 5:
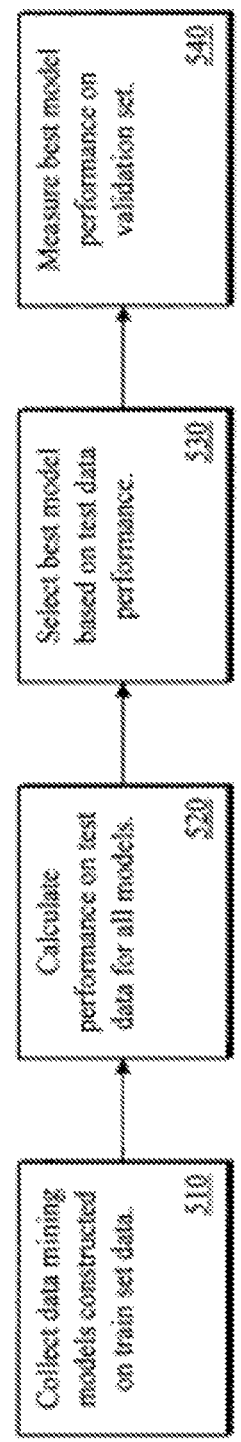
FIG. 5 is a block diagram illustrating the process of using test data to select a model.

Some prior art model selection methods refer exclusively to the train data. In such cases, the best model is identified from calculations based on train data alone. Other prior art methods, as well as the example embodiment of the present application, use test data for model selection. The process of using test data to select a model is illustrated in FIG. 5. At block 510, a collection of models is constructed using the train data. Predictive performance for all such models is measured on test data, block 520. A best or preferred model is then selected on the basis of test data performance 530. Because the "best" model is not necessarily the model with the absolute best predictive performance, prior art includes methods for taking model complexity into account when selecting the best, optimal or preferred model. One well-known prior art method that takes the inherent uncertainty in test statistics into account in model selection is the 1SE rule introduced by Breiman, Friedman, Olshen, and Stone in 1984. That method selects as "best" the smallest decision tree exhibiting a performance measure statistically indistinguishable from the absolutely best-performing tree. Once the best model has been selected, the model performance optionally may be measured again using validation data 540. It should be noted that, historically, some authors use "test" where the present disclosure uses "validate" and vice versa.

Figure 6:
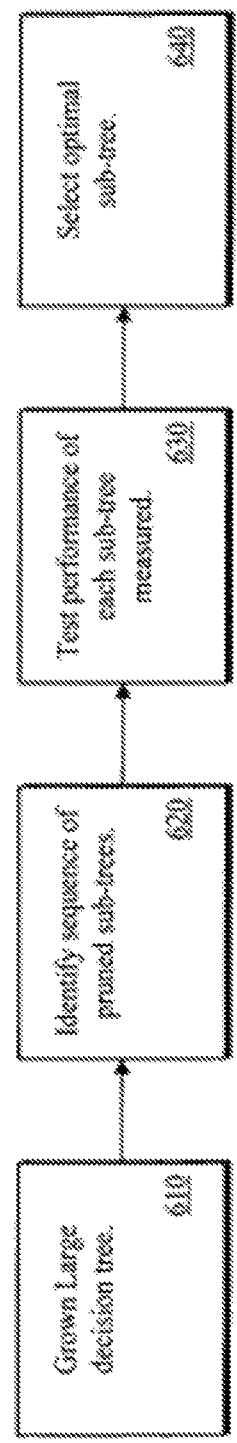
FIG. 6 is a block diagram illustrating a prior art optimal decision tree selection process employing cost-complexity pruning.

FIG. 6 illustrates a prior art optimal decision tree selection employing cost-complexity pruning. First, an overly large decision tree is grown at block 610. Based on calculations involving the tree and the training data alone a set of pruned sub-trees are identified at block 620. The sub-trees are arranged from largest to smallest and the performance of each tree is then measured using the test data, as shown at block 630. The optimal tree is then selected at block 640. According to the prior art, the best tree is usually defined as the tree with the best performance on test data. However, the best tree may also be defined by taking the size of the tree into account.

Figure 7:
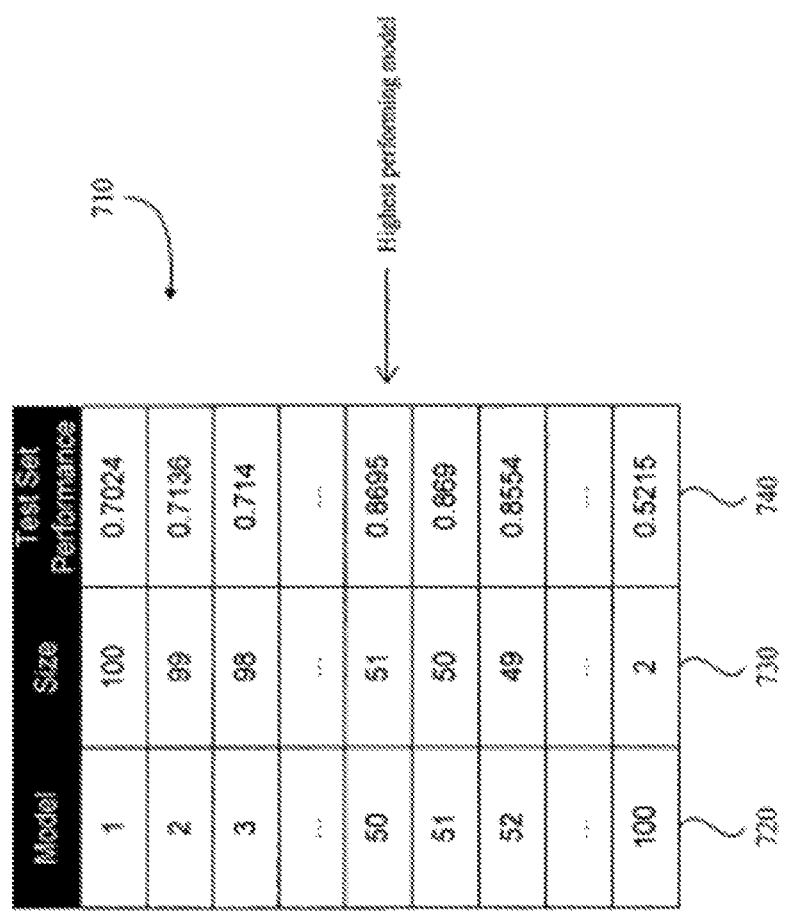
FIG. 7 is a chart displaying selected rows from a table summarizing the test results for a set of pruned decision trees.

FIG. 7 is a chart that displays selected rows from a table 710 summarizing the test results for a set of pruned decision trees. Column 720 identifies each model with a number. Column 730 contains the size of the model measured by the number of terminal nodes in the tree, and column 740 lists the model performance. In this example, because higher performance scores are preferred, the model obtaining the highest performance is singled out. For regression trees, performance might be measured as R-squared, and for classification trees, performance might be measured as classification accuracy, misclassification cost-adjusted misclassification rate, or area under the ROC curve, but other performance measures may readily be used instead.

Figure 8:
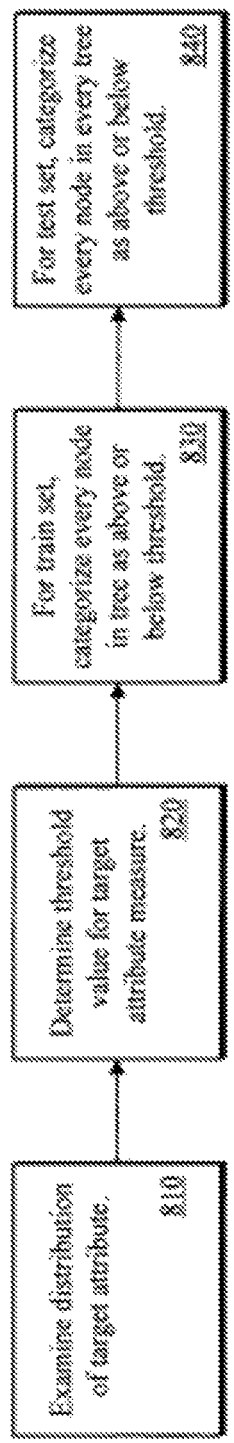
FIG. 8 is a block diagram illustrating a selection of a threshold or node decision criterion which is employed to categorize every node in a decision tree with reference to a lift ratio.

FIG. 8 is a block diagram illustrating the selection of a threshold or node decision criterion, according to the present application, which is employed to categorize every node in a decision tree. At block 810, the distribution of the target attribute is examined. For classification problems, one may wish to examine the fraction of the overall data that belongs to a specific class. In marketing applications, for example, this could be the overall response rate to a marketing campaign. For regression models, one might consider the mean, trimmed mean or median value of the target in the data. The data examined could be restricted to the train set, or could incorporate all the historical data including train, test, and validation sets. A threshold for the target attribute is then selected at block 820. The threshold is typically the mean of the target in the overall or train data, but the present invention is not limited to the use of means. Then, for every node in every tree, the LIFT ratio is calculated. The LIFT ratio is the ratio of the prediction made in that node to the selected threshold value based on the train data 830. The lift ratio is computed again for the test data at block 840.

Figure 9:
FIG. 9 is a chart illustrating how the lift ratios of FIG. 8 may be used to apply the direction agreement test of the present application.

FIG. 9 illustrates how the lift ratios of FIG. 8 are used in the disclosed application. Example table 910 contains one row for every terminal node of a selected sub-tree and reports the lift ratio as calculated from both the train and test data. The following tests are conducted for the selected tree: (1) For every node, it is determined if the train and test lift ratios are both greater than or equal to 1, or both less than or equal to 1. Of course, values other than 1.0 could be selected. Nodes that have train and test lift ratios on the same side of the threshold are said to AGREE on the direction of the node. Nodes that have train and test lift ratios on opposite sides of the threshold are said to DISAGREE on the direction. (2) For every node, an appropriate statistical measure of the difference between the two measures of the lift ratio is calculated. In the example embodiment, this difference is measured with a t-statistic, but other measures, including measures adjusted for multiple comparisons may be used instead. Chart 910 shows that this six-node tree displays a direction disagreement in node 4 in that the train lift of 0.52 is below the threshold of 1.0 whereas the test lift of 1.03 is greater than 1.0. In this example table, exact agreement is required. No forgiveness is allowed for disagreements, no matter how small. According to table 910, a tree is said to agree only if every terminal node displays train and test agreement. If even a single node disagrees then the entire tree is said to disagree.

Figure 10:
FIG. 10 is a chart illustrating the application of a fuzzy or approximate criterion when determining whether the train and test data agree on the direction of a specific node.

FIG. 10 is a table that illustrates the application of a fuzzy or approximate criterion when determining whether the train and test data agree on the direction of a specific node. Table 1010 differs from Table 910 in that it allows for approximate agreement and will forgive disagreements that are sufficiently small. In Table 1010, some nodes are said to agree under the fuzzy calculations because the train and test difference statistic is less than a specified value. In the example table, a z-score cutoff of 3.0 is used to illustrate the process. Because all the disagreements in Table 910 have an absolute value of z-score less than 3.00, all qualify as nodes that "Agree."

FIGS. 11A, 11B together depict two tables 1110 and 1120 that illustrate an additional test of the present application. In the first table 1110, the nodes of an exemplary tree are displayed where the nodes are ordered from highest to lowest train set lift. The largest lift is assigned a rank of 1, the second largest lift is assigned a rank of 2, and so forth. The nodes are then re-ranked using the test set lifts. Table 1110 contains both sets of ranks, which are compared. Nodes assigned the same rank in both the train and test sets are said to MATCH; otherwise, they are said to MISMATCH. Table 1120 displays the nodes again after applying a fuzzy match criterion. A node that literally mismatches on the train and test set ranks but that satisfies the rank match statistical test is permitted to qualify as a match. The mathematical details of this statistical test are set forth in greater detail below.

Figure 12:
FIG. 12 is a chart illustrating how direction agreement and rank match tests can be combined.

The tests described above are combined and illustrated in example Table 1210 of FIG. 12. Direction agreement and rank match tests are computed for every terminal node in a tree being considered for acceptance, and various other statistics such as the sample sizes in each node are reported. Table 1210 also includes examples of some additional summary statistics that might be reported for each node.

FIG. 13 illustrates a summary table 1310 designed to assist an analyst to select an optimal or preferred tree. For each tree in the collection of models under consideration, table 1310 reports whether every terminal node passes both direction agreement and rank match tests as well as a count of the number of nodes failing each test. Optionally, the agreement and rank match tests may be calculated using a fuzzy criterion. In one embodiment, the optimal or preferred tree is the largest tree satisfying both tests that is no larger than the best-performing tree. Decision makers may wish to judgmentally examine trees with a small number of test failures if those trees otherwise have sufficiently desirable performance characteristics such as high accuracy. In this way, they might choose trees that are a compromise between prior art optimal trees and those selected in accordance with the methods of the present application.

The disclosed methodologies make use of comparisons between train and test data in the terminal nodes of a decision tree. When a tree model is tested via cross validation, no generally accepted method for identifying a node-specific test sample exists. Without such a node-specific sample, the tests introduced in the present application would not be able to be computed. To address this problem in the special case of classification trees, one may employ a method known as the "Breiman Adjustment" that allows one to produce an estimate of the test sample statistics used by the present application. Such estimates may be used when an analyst elects to use the cross-validation method for tree testing. That is, the Breiman method may be used to estimate a cross-validated test sample count in each node, and then the methods of the present application may be applied to calculate train/test consistency checks within each terminal node of a classification tree.

Agreement and matching in the train/test consistency checks need not be exact to satisfy the practical requirements of an analyst. Statistical theory teaches that some apparent disagreements may reflect innocuous sampling variability rather than genuine overfitting. The decision maker may therefore set a parameter reflecting how close the train and test statistics must be to qualify as consistent, or alternatively how far apart train and test statistics may be and still qualify as consistent. A fuzzy version of the train/test consistency checks allows small and unimportant failures to be ignored. Using these tests, an analyst may require literal agreement and matching in every node or in a sufficiently large fraction of nodes, or use agreement and matching criteria that forgive modest disagreements and mismatches, with the user controlling the magnitude of the disagreement or mismatch that can be ignored.

When allowing for approximate agreement and rank matching, and in measuring the degree of difference between train and test outcomes in any node, one may rely on statistical measures. Here, common measures are presented, but the present invention is not limited to the use of these exemplary statistics; other test statistics can be used. In a given node o, there are two sets of records, one for the training set and another for the test set. Values of the dependent variable y in the training set are denoted by $y_{olj}$, j=1, K, $n_{ol}$, where the "l" index is meant to suggest "learn" while the values of the dependent variable in the test set are denoted by $y_{otj}$, j=1, K, $n_{ot}$, and the "t" index suggests "test." Here, $n_{ol}$ and $n_{ot}$ denote the number of values at node o in the training (learning) and test sets, respectively.

For continuous variables the node means for the training and test sets are given as:

$$\bar{y}_{ol} = \frac{1}{n_{ol}} \sum_{j=1}^{n_{ol}} y_{olj} \text{ and}$$

$$\bar{y}_{ot} = \frac{1}{n_{ot}} \sum_{j=1}^{n_{ot}} y_{otj},$$

respectively.

For categorical variables, one would be interested in the proportion of the node sample represented by a particular class. Let δ(logical expression) denote an indicator function that is equal to 1 when the logical expression is TRUE, and is equal to zero otherwise, and let z=="A" be a logical expression that evaluates to TRUE if the categorical value z is equal to "A". Finally, let "G" be the categorical value of the group of interest. Then the proportions for G are computed for node o in the training and tests sets as:

$$p_{ol} = \frac{1}{n_{ol}} \sum_{j=1}^{n_{ol}} \delta(y_{olj} == "G") \text{ and}$$

$$p_{ot} = \frac{1}{n_{ot}} \sum_{j=1}^{n_{ot}} \delta(y_{otj} == "G"),$$

respectively.

For classification trees, a two-sample test on proportions may be used. Let $\bar{p}=(n_{ol}p_{ol}+n_{ot}p_{ot})/(n_{ol}+n_{ot})$ be the mean proportion in the pooled learn and test samples for the node in question. Then the agreement test statistic may be calculated as:

$$z = \frac{p_{ol} - p_{ot}}{\sqrt{\bar{p}(1-\bar{p})\left(\frac{1}{n_{ol}} + \frac{1}{n_{ot}}\right)}}.$$

For independent and identically distributed random variables, this statistic is asymptotically distributed according to the standard normal distribution. These assumptions are not necessarily met here, but the standard normal distribution still provides a good reference distribution and a convenient metric for measuring the train/test deviation. Due to the discrete nature of the indicator function, a so-called "continuity correction" is often applied although we have not used such a correction here.

Regression models differ from classification models in that in regression no natural decision such as a class label assignment would be associated with any terminal node. One first defines:

$$s_o^2 = \frac{\sum_{j=1}^{n_{o1}} (y_{olj} - \bar{y}_{ol})^2 + \sum_{j=1}^{n_{o2}} (y_{otj} - \bar{y}_{ot})^2}{n_{ol} + n_{ot} - 2}$$

which is the pooled train/test sample variance. Then the agreement statistic is calculated as:

$$t = \frac{\bar{y}_{ol} - \bar{y}_{ot}}{\sqrt{s_o^2 \left(\frac{1}{n_{ol}} + \frac{1}{n_{ot}}\right)}}.$$

For independent and identically distributed random variables, this statistic is distributed according to the students t distribution with $n_{ol}+n_{ot}-2$ degrees of freedom. These assumptions are not necessarily met here, but this distribution still provides a good reference distribution and a convenient metric for measuring the train/test deviation. An analyst could convert the regression problem into something very similar to a classification problem by selecting a threshold. Nodes would then be compared for train/test agreement as to whether the node was above or below the threshold.

In the RANK MATCH test, ranks may be computed for each terminal node of a tree, and are computed separately for every tree being examined. The ranks are based on a summary statistic computed from the records in the terminal nodes and are computed separately for the training and test sets. For regression, a summary statistic that can be used is the node mean, $\bar{y}_{ol}$ in the training set, and $\bar{y}_{ot}$ in the test set, although other statistics such as trimmed means and the node median would also be suitable. For classification trees, the ranks are computed for the node proportion represented by the target attribute class "G". These proportions are referred to by $p_{ol}$ for the training set and $p_{ot}$ for the test set. Let $r_{ol}$, o=1, K, $n_k$ and $r_{ot}$, o=1, K, $n_k$ denote these ranks of the terminal node proportions, where tied ranks are averaged. In the rank tests, ranks are first established in the training set, and then the hypothesis for each node, that the rank of that node in the test set is equal to the rank of the node in the training set, is tested. If the ranks are identical, it can be said that the ranks match, and there is nothing to test. If the ranks do not match, one can either declare a mismatch or allow for an approximate or fuzzy match. To allow for a fuzzy match when a literal mismatch in the ranks is observed, one can apply a test to determine if there is evidence of substantial disagreement (mismatch) between the train and test samples. To conduct this test, a novel test is introduced based on the test data alone, as follows. Suppose that in the train data the node in question is ranked j whereas in the test data the node is ranked k. Observe that if in the test data one could swap the ranks of the j'th ranked and the k'th ranked node then there would be no mismatch. One can therefore test whether these two nodes are sufficiently close so as to be able to claim that the observed mismatch is insubstantial. In the example embodiment of the invention, for classification trees one can conduct the following test to compare the test data in the j'th ranked and the k'th ranked nodes. One can construct the test statistic:

$$z = \frac{p_{jt} - p_{kt}}{\sqrt{\bar{p}_a(1-\bar{p}_a)\left(\frac{1}{n_{jt}} + \frac{1}{n_{kt}}\right)}},$$

where $\bar{p}_a = (n_{jt}p_{jt}+n_{kt}p_{kt})/(n_{jt}+n_{kt})$ is the proportion of target class G in the data of the two nodes when pooled. If the assumptions of the test are met, this test statistic follows a standard normal distribution under the null hypothesis of no difference.

The rank match test statistic in the preferred embodiment for regression trees is similar but is based on a test of means in the j'th ranked and the k'th ranked nodes. The test is given as:

$$t = \frac{\bar{y}_{jt} - \bar{y}_{kt}}{\sqrt{s_{jk}^2 \left(\frac{1}{n_{jt}} + \frac{1}{n_{kt}}\right)}} \text{ where}$$

$$s_{jk}^2 = \frac{\sum_{m=1}^{n_{jt}} (y_{jtm} - \bar{y}_{jt})^2 + \sum_{m=1}^{n_{kt}} (y_{ktm} - \bar{y}_{kt})^2}{n_{jt} + n_{kt} - 2}$$

If the assumptions of the test are met, this test statistic follows the students t distribution with $n_{jt}+n_{kt}-2$ degrees of freedom under the null hypothesis of no difference. Again, other tests are possible, based on medians, trimmed means, or other node outcome summaries. This test has the advantage of being based entirely on the test sample. The training data are used only to establish the reference ranking of the nodes; we then determine if the test data can plausibly match this ranking.

The present invention has applicability in many different applications. In one application the optimal tree is for identifying prospective customers in a targeted marketing campaign. The tree identifies those prospects most likely to respond to targeted marketing, for example, in the form of Internet advertising, direct mail marketing, outbound telemarketing, and call center offers. In another application the optimal tree is for credit risk scoring and the terminal nodes of the tree are used to assign individuals or companies seeking credit to risk grades. Virtually limitless other applications and embodiments may now occur to the reader.

While several embodiments of the present invention have been described above, it should be understood that these have been presented by way of example only, and not limitation. Thus, the breadth and scope of the present invention should not be limited by any of the above-described exemplary embodiments, but should be defined only in accordance with the following claims and their equivalents.

The invention claimed is:

1. A method implemented on a general purpose computer with processor-executable program instructions configured to direct at least one processor and at least one stored data table, the at least one stored data table comprising a plurality of records and a plurality of columns and including data useful for creating and evaluating a predictive model, to automatically select a preferred size tree or sub-tree among a plurality of trees, the method comprising:
   accessing the at least one stored data table;
   partitioning the data useful for creating and evaluating a predictive model to identify a training set of records and a test set of records within the data table records;
   constructing, by predictive analysis of the training set of records, a collection of at least one fitted tree or sub-tree, each tree or sub-tree having at least one node, at least one node of each tree or sub-tree being a terminal node;
   determining the training set records associated with each node of each tree or sub-tree;
   determining the test set records associated with each node of each tree or sub-tree;
   determining at least one node decision criterion useful to examine a distribution in data of at least one attribute;
   determining a distribution in data of at least one attribute for each node of each tree or sub-tree, the data including at least one of: train data, test data, validation data, or historical data;
   determining at least one lift ratio threshold;
   determining at least one prediction for each node of each tree or sub-tree as a function of at least one node decision criterion and a distribution in data of at least one attribute, the data including at least one of: train data, test data, validation data, or historical data;
   calculating test set lift ratio and training set lift ratio for each node of each tree or sub-tree as a function of: at least one prediction made in each node, and at least one node decision criterion;
   determining a direction agreement statistic and a rank match statistic associated with each node of each tree or sub-tree;
   determining at least one predictive accuracy performance measure associated with each tree or sub-tree;
   calculating the direction agreement statistic and the rank match statistic for each node of each tree or sub-tree for two or more of: training set records, test set records, validation set records, or historical records;
   calculating a predictive accuracy performance score for each tree or sub-tree as a function of the at least one predictive accuracy performance measure and based on records limited to the test set of records;
   determining for each node of each tree or sub-tree, for training set records and test set records, direction agreement and rank match agreement, in accordance with at least one of: an exact match or a fuzzy match, the direction agreement and rank match agreement determined as a function of: at least one lift ratio, at least one lift ratio threshold, at least one direction agreement statistic, and at least one rank match statistic;
   identifying zero or more of a preferred tree or sub-tree based on the step of determining direction agreement and rank match agreement;
   selecting as the preferred size tree or sub-tree the largest preferred tree or sub-tree satisfying both direction agreement and rank match agreement that is no larger than the tree or sub-tree having the best predictive accuracy performance score based on the test set of records; and
   providing access to a decision maker to the preferred size tree or sub-tree for generating predictive analytic output as a function of input data, wherein selection of the preferred size tree or sub-tree is based on: direction agreement and rank match agreement determined for each node of each tree or sub-tree as a function of both the train set of records and the test set of records, predictive accuracy performance score determined for each tree or sub-tree as a function of records limited to the test set of records, and tree or sub-tree size.

2. The method of claim 1 wherein the direction agreement statistic is determined in accordance with a technique selected from the group consisting of differences of means, trimmed means, medians, proportions, lifts using associated z-scores, and lifts using t-statistics.

3. The method of claim 2 wherein the z-scores and t-statistics are adjusted for a plurality of simultaneous comparisons to allow for a false discovery rate.

4. The method of claim 2 wherein the z-scores and t-statistics are adjusted for a plurality of simultaneous comparisons to allow for conventional Bonferroni adjustment.

5. The method of claim 1 wherein the step of identifying zero or more of a preferred tree or sub-tree is based on a number of terminal nodes displaying divergences above predetermined thresholds.

6. The method of claim 1 wherein the step of identifying zero or more of a preferred tree is based on a degree of mismatching of the rank match statistic.

7. The method of claim 1 wherein the step of identifying zero or more of a preferred tree or sub-tree is based on a number of nodes mismatching on the rank match statistic.

8. The method of claim 1 wherein the steps of determining a direction agreement statistic and a rank match statistic and calculating the direction agreement statistic and the rank match statistic for each node of each tree or sub-tree are performed on only terminal nodes.

9. The method of claim 1 wherein the step of determining a direction agreement statistic and a rank match statistic associated with each node of each tree or sub-tree is performed using a validation set of records.

10. The method of claim 1 wherein the preferred tree or sub-tree is for identifying marketing prospects for a targeted marketing campaign.

11. The method of claim 1 wherein the preferred tree or sub-tree is for credit risk scoring and the terminal nodes of the preferred tree represent credit risk grades.

12. A system to automatically select a preferred size tree or sub-tree among a plurality of trees, comprising:
    one or more processor;
    at least one stored data table comprising a plurality of records and a plurality of columns and including data useful for creating and evaluating a predictive model; and
    a memory that is not a transitory propagating signal, the memory connected to one or more processor and encoding computer readable instructions, including processor executable program instructions, the computer readable instructions accessible to the one or more processor, wherein the processor executable program instructions, when executed by one or more processor, cause one or more processor to perform operations comprising:
        access the at least one stored data table;
        partition the data useful for creating and evaluating a predictive model to identify a training set of records and a test set of records within the data table records;
        construct, by predictive analysis of the training set of records, a collection of at least one fitted tree or sub-tree, each tree or sub-tree having at least one node, at least one node of each tree or sub-tree being a terminal node;
        determine the training set records associated with each node of each tree or sub-tree;
        determine the test set records associated with each node of each tree or sub-tree;
        determine at least one node decision criterion useful to examine a distribution in data of at least one attribute;
        determine a distribution in data of at least one attribute for each node of each tree or sub-tree, the data including at least one of: train data, test data, validation data, or historical data;
        determine at least one lift ratio threshold;
        determine at least one prediction for each node of each tree or sub-tree as a function of at least one node decision criterion and a distribution in data of at least one attribute, the data including at least one of: train data, test data, validation data, or historical data;
        calculate test set lift ratio and training set lift ratio for each node of each tree or sub-tree as a function of: at least one prediction made in each node, and at least one node decision criterion;
        determine a direction agreement statistic and a rank match statistic associated with each node of each tree or sub-tree;
        determine at least one predictive accuracy performance measure associated with each tree or sub-tree;
        calculate the direction agreement statistic and the rank match statistic for each node of each tree or sub-tree for two or more of: training set records, test set records, validation set records, or historical records;
        calculate a predictive accuracy performance score for each tree or sub-tree as a function of the at least one predictive accuracy performance measure and based on records limited to the test set of records;
        determine for each node of each tree or sub-tree, for training set records and test set records, direction agreement and rank match agreement, in accordance with at least one of: an exact match or a fuzzy match, the direction agreement and rank match agreement determined as a function of: at least one lift ratio, at least one lift ratio threshold, at least one direction agreement statistic, and at least one rank match statistic;
        identify zero or more of a preferred tree or sub-tree based on the step of determining direction agreement and rank match agreement;
        select as the preferred size tree or sub-tree the largest preferred tree or sub-tree satisfying both direction agreement and rank match agreement that is no larger than the tree or sub-tree having the best predictive accuracy performance score based on the test set of records; and
        provide access to a decision maker to the preferred size tree or sub-tree for generating predictive analytic output as a function of input data, wherein selection of the preferred size tree or sub-tree is based on: direction agreement and rank match agreement determined for each node of each tree or sub-tree as a function of both the train set of records and the test set of records, predictive accuracy performance score determined for each tree or sub-tree as a function of records limited to the test set of records, and tree or sub-tree size.

13. The system of claim 12 wherein the instructions direct the processor to determine the direction agreement statistic in accordance with a technique selected from the group consisting of: differences of means, trimmed means, medians, proportions, lifts using associated z-scores, and lifts using t-statistics.

14. The system of claim 13 wherein the z-scores and t-statistics are adjusted for a plurality of simultaneous comparisons to allow for a false discovery rate.

15. The system of claim 13 wherein the z-scores and t-statistics are adjusted for a plurality of simultaneous comparisons to allow for conventional Bonferroni adjustment.

16. The system of claim 12 wherein the instructions direct the processor to identify zero or more of a preferred tree or sub-tree based on a number of terminal nodes displaying divergences above predetermined thresholds.

17. The system of claim 12 wherein the instructions direct the processor to identify zero or more of a preferred tree or sub-tree based on a degree of mismatching of the rank match statistic.

18. The system of claim 12 wherein the instructions direct the processor to identify zero or more of a preferred tree or sub-tree based on a number of nodes mismatching on the rank match statistic.

19. The system of claim 12 wherein the instructions direct the processor to determine a direction agreement statistic and a rank match statistic and calculate the direction agreement statistic and the rank match statistic for each terminal node of each tree.

20. The system of claim 12 wherein the instructions direct the processor to determine a direction agreement statistic and a rank match statistic associated with each node of each tree using a validation set of records.

* * * * *

UNITED STATES PATENT AND TRADEMARK OFFICE
CERTIFICATE OF CORRECTION

PATENT NO. : 9,524,476 B2  
APPLICATION NO. : 15/081790  
DATED : December 20, 2016  
INVENTOR(S) : Dan Steinberg et al.

Page 1 of 1

It is certified that error appears in the above-identified patent and that said Letters Patent is hereby corrected as shown below:

In the Specification

Column 10, Line 52, please delete "not" and insert --$n_{oi}$--.

Column 12, Line 15, please delete "poi" and insert --$p_{oi}$--.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*